United States Patent
Schmid-Schoenbein (10) Patent No.: US 10,693,110 B2
(45) Date of Patent: Jun. 23, 2020

(54) POUCH FILM FOR A BATTERY CELL SYSTEM

(71) Applicant: Robert Bosch GmbH, Stuttgart (DE)

(72) Inventor: Christian Schmid-Schoenbein, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 15/841,852

(22) Filed: Dec. 14, 2017

(65) Prior Publication Data

US 2018/0205046 A1 Jul. 19, 2018

(30) Foreign Application Priority Data

Dec. 15, 2016 (DE) .................. 10 2016 225 160

(51) Int. Cl.
*H01M 2/02* (2006.01)
*H01M 10/0525* (2010.01)
*H01M 10/04* (2006.01)
*H01M 2/10* (2006.01)
*H01M 10/6555* (2014.01)

(52) U.S. Cl.
CPC ....... *H01M 2/0275* (2013.01); *H01M 2/0242* (2013.01); *H01M 2/0247* (2013.01); *H01M 2/0267* (2013.01); *H01M 2/1061* (2013.01); *H01M 2/1077* (2013.01); *H01M 10/0413* (2013.01); *H01M 10/0525* (2013.01); *H01M 10/6555* (2015.04); *H01M 2/0245* (2013.01)

(58) Field of Classification Search
CPC .. H01M 2/021; H01M 2/0242; H01M 2/0247; H01M 2/0267; H01M 2/0275; H01M 2/1061; H01M 2/1077; H01M 10/6555
USPC .......................................... 429/163
See application file for complete search history.

(56) References Cited

U.S. PATENT DOCUMENTS

| | | | |
|---|---|---|---|
| 2009/0023057 A1 | 1/2009 | Kim | |
| 2013/0000110 A1 | 1/2013 | Takeda et al. | |
| 2013/0273413 A1 | 10/2013 | Fahlgren et al. | |
| 2016/0099454 A1* | 4/2016 | Kwon | H01M 2/204 429/159 |
| 2017/0025723 A1 | 1/2017 | Isozaki et al. | |

FOREIGN PATENT DOCUMENTS

| WO | 2014038891 | 3/2014 |
|---|---|---|
| WO | 2015140952 | 9/2015 |

* cited by examiner

*Primary Examiner* — James M Erwin
(74) *Attorney, Agent, or Firm* — Michael Best & Friedrich LLP (57) ABSTRACT

A pouch film (3) for a battery cell system (1) is described, the pouch film (3) forming mutually separate pockets (12) for the insertion of electrode assemblies (5), the pockets (12) being impermeable to electrolyte, and the pockets (12), particularly when the battery cell system (1) is in the operating state, being physically connected to one another in a foldable manner via the pouch film (3).

20 Claims, 6 Drawing Sheets

POUCH FILM FOR A BATTERY CELL SYSTEM

BACKGROUND OF THE INVENTION

The present invention relates to a pouch film for a battery cell system, to a battery cell system, to a method for producing the same, to a battery module, and to a battery.

A battery cell is an electrochemical energy storage device that, when being discharged, converts the stored chemical energy into electrical energy by an electrochemical reaction. It is becoming apparent that, in the future, new battery systems, for which there are very stringent requirements in respect of reliability, safety, performance capability and service life, will be used both in stationary applications, such as wind turbines, in motor vehicles designed as hybrid or electric motor vehicles, and in electronic devices. Owing to their high energy density, lithium-ion batteries, in particular, are used as energy storage devices for electrically driven motor vehicles.

US 2013/0273413 discloses a battery having a multiplicity of cells that are disposed on a plate. When ready for operation, the battery has an asymmetrical shape, such that use can be made of available space inside a portable electronic device.

WO 2014/038891 has a secondary battery having a multiplicity of electrode assemblies that are inserted in cavities of a continuous sheath. The sheath is then partitioned off between each of the electrode assemblies, such that the electrode assemblies are separate from one another in their cavities.

SUMMARY OF THE INVENTION

Provided according to the invention are a pouch film for a battery cell system, and a battery cell system, in particular a lithium-ion battery cell system, a method for producing a battery cell system, a battery module, a battery, and the use of the same.

The term pouch film in the context of this invention is to be understood to mean a flexible film, in particular a composite film, that is impermeable to electrolyte. The pouch film comprises, for example, a polypropylene, a polyamide, a polyethylene terephthalate and/or a polybutylene terephthalate.

The pouch film comprises, for example, instead of a conventional pouch film composed of laminate and aluminum, a laminate without aluminum, in particular without metal.

The pouch film has, for example, a thickness of 40-200 µm; particularly preferably, the pouch film has a thickness of 153 µm.

The term electrode composite is to be understood to mean a composite comprising at least one anode and at least one cathode that can reversibly take in and give out lithium ions.

During the charging of lithium-ion cells, lithium ions migrate from the cathode, through the electrolyte, to the anode, and are taken into the latter. At the same time, electrons likewise migrate, via an external circuit, from the cathode to the anode. During discharging of lithium-ion cells, these processes occur in the reverse direction, such that lithium ions migrate from the anode to the cathode, and are taken into the latter.

Furthermore, the electrode assembly comprises at least one separator, which separates the anode and the cathode from each other, both spatially and electrically.

The anode, the separator and the cathode may be coiled in one another or stacked on one another.

The cathode comprises, for example, a cathode carrier foil that is designed so as to be electrically conductive and that comprises, for example, an aluminum. The cathode active material, for example a combination of differing lithium metal oxides LiMeO, is applied, at least partly, to the cathode carrier foil. Alternatively, the cathode active material comprises a non-oxidic material. An edge strip of the cathode carrier foil, for example, is not coated with active material, from which, for example, one or more cathode contact lugs, which serve to electrically contact the cathode, are then cut.

The anode comprises, for example, an anode carrier foil that is designed so as to be electrically conductive and that comprises, for example, a copper. The anode active material is applied, at least partly, to the anode carrier foil. The anode active material comprises, for example, a natural and/or synthetic graphite, a silicon and/or a titanate. An edge strip of the anode carrier foil, for example, is not coated with active material, from which, for example, one or more anode contact lugs, which serve to electrically contact the anode, are then cut. The material of the separator comprises, for example, a polyolefin, in particular a polypropylene and/or a polyethylene, a fluorinated polyolefin, a polyimide, an alkane, a polytetrafluoroethylene, a polyvinylidene fluoride and/or a polyethylene terephthalate.

Disclosed according to the invention is a pouch film for a battery cell system, which pouch film has mutually separate pockets for the insertion of electrode assemblies. The pockets are impermeable to electrolyte, and thus serve, for example, as a barrier for an electrolyte. The pockets, particularly when the battery cell system is in the operating state, are physically connected to one another in a foldable manner via the pouch film.

It is advantageous in this case that the pouch film is very flexible, such that the structure with the coherent pockets can be produced very easily, since the pouch film can be bent, folded, heated and sealed without being damaged, and is also flexible, elastic and foldable following production. There is also a cost saving, since the production of the pouch film can be effected continuously in one piece, which requires little work and is very time-effective. Furthermore, the material costs of a pouch film are very low, for example in comparison with other sheaths or enclosures of electrode assemblies such as, for example, prismatic hard-sided enclosures.

Furthermore, the invention discloses a battery cell system, in particular a lithium-ion battery cell system, having a corresponding pouch film having at least two pockets and having at least two electrode assemblies. The electrode assemblies are inserted in the mutually separate pockets of the pouch film. Thus, respectively one electrode assembly, together with a pocket of the pouch film, forms a battery cell, or a pouch cell, the pouch cells being physically connected to one another in a foldable manner via the pouch film. It is advantageous in this case that such a battery cell system can be configured so as to be highly flexible. The pouch film, with the coherent pockets, can be folded in a great variety of ways, such that the shape of the battery cell system, and thus also the contacting of the individual pouch cells, can be configured individually, for example in respect of space requirement, size, folding techniques and contacting possibilities. Moreover, it is advantageous that the battery cell system does not have a limit in respect of stack height. For example, a plurality of battery cell systems may be stacked on one another, or at least one battery cell system may be folded in such a manner that the coherent pouch cells are disposed on one another. Furthermore, the proposed battery cell system is flexible in respect of the cell chemistry used. For example, a solid cell system may be used, for example having a solid as an electrolyte. Alternatively, a liquid electrolyte is used. Moreover, the battery cell system, with the pouch film having pockets, can be used at low, medium and high temperatures, of up to 100° C. Furthermore, it is advantageous that, owing to the flexible pouch film surrounding them, the electrode assemblies inserted in the pockets of the pouch film can swell, for example as a result of processes of taking in or giving out the lithium ions, or as a result of aging. This prevents the electrode assemblies from being displaced or damaged as a result of excessive pressure acting on them.

In a particularly preferred embodiment, the pouch film does not comprise any aluminum, in particular any metal. The pouch film then forms an electrolyte barrier, but not a moisture barrier. In the case of a battery having a corresponding pouch film, the moisture barrier is then inserted, for example, at the module level. An advantage of a pouch film having no aluminum, in particular no metal, is that there is no need for electrical insulation, for example in the form of an insulation band, at cutting edges of the pouch film. As a result, savings are made in costs, material, time and work resources. It is furthermore advantageous that, as a result of there being no aluminum, or metal, inserted in the material, in particular in the laminate, of the pouch film, the risk of corrosion of the pouch film is averted. Furthermore, the pouch film, not having any aluminum, in particular any metal, is thinner and lighter than pouch films that do have aluminum. Furthermore, it is advantageous that pouch films without aluminum, in particular without metal, are much more deformable than pouch films that do have aluminum, or a metal. This is advantageous, for example, if particles inadvertently get onto or into the pouch film, for example during production of a battery cell system having a corresponding pouch film. The pouch film can then stretch around the particle and adapt itself to the latter, without being damaged or holed. Moreover, it is advantageous that a material, in particular a laminate, without aluminum, or without a metal, is significantly less expensive than a material having aluminum, or a metal.

In a particularly preferred embodiment, the pouch film has a length L and a width B, the length L in particular being longer than the width B. The pouch film is folded over along the longitudinal extent, such that there are two pouch film halves that are disposed on one another. This results in an open end and an end that is closed by the folding-over of the pouch film. The pouch film halves are joined together, along the width, at intervals, in particular at regular intervals, in such a manner that there are pockets that are spatially separate from one another.

It is particularly advantageous in this case that the closed ends of the pouch film halves do not have to be joined together, since they are already coherent. Furthermore, it is advantageous that the pouch film is one coherent piece, and it is not necessary to have regard to individual parts when folding-over one of the pouch film halves or joining the pouch film halves together along the width. Assembling of the coherent pouch film with pockets can thereby be realized very easily and rapidly.

In an alternative embodiment, the pouch film halves are joined together along the width at irregular intervals. This may be advantageous, for example, in the subsequent folding of the individual pouch cells that cohere by means of the pouch film.

In a particularly preferred embodiment, the pockets of the pouch film are closed along the length, at least partly, at their open end, by joining together of the two pouch film halves. It is advantageous in this case that this produces a space inside the pocket that is sealed off, at least for electrolyte, and into which, for example, the electrolyte can be filled or introduced. The pockets of the pouch film are then also protected, for example, against contamination, for example particles, since the latter cannot pass through the sealed pouch film.

In a particularly preferred embodiment, the joining together of the pouch film halves is effected in the form of seams, in particular sealed seams. In this case the seams that separate the pockets from one another along the width are transverse seams, and the seam that closes the pockets along the length is a longitudinal seam.

It is advantageous in this case that, on the one hand, the seams are flexible, and for example can be stretched to a certain degree, but that the pouch film halves are nevertheless coherent.

In a particularly preferred embodiment, at least one anode contact lug of an anode of the electrode assembly and at least one cathode contact lug of a cathode of the electrode assembly project beyond the pocket, on the same side of the pocket, in particular in an offset manner in relation to one another. The anode contact lug and the cathode contact lug serve the function of electrical contacting. It is advantageous if at least one anode contact lug of an anode of the electrode assembly and at least one cathode contact lug of a cathode of the electrode assembly project out beyond the pocket, on the same side of the pocket, in particular in an offset manner in relation to one another, the contact lugs thus being oriented away from the pouch film, such that there is sufficient space for the electrical contacting of the anode contact lug and cathode contact lug.

Alternatively at least one anode contact lug of an anode of the electrode assembly and at least one cathode contact lug of a cathode of the electrode assembly project beyond the pocket on mutually opposite sides of the pocket. It is advantageous in this case that a very homogeneous current density is obtained during operation.

Disclosed in the following is a first method for producing a battery cell system according to the invention, wherein the anode contact lugs and the cathode contact lugs are disposed on the same sides of the electrode assembly. The pouch film of the battery cell system has a length and a width, the length of the pouch film in particular being longer than the width. The first method has the following steps:

A) Applying electrode assemblies, comprising at least one anode having at least one anode contact lug, at least one separator, and at least one cathode having at least one cathode contact lug, to the pouch film, such that the anode contact lugs and the cathode contact lugs project beyond a first length of the pouch film, in particular in an offset manner in relation to one another. The electrode assemblies in this case cover not more than half of the width of the pouch film and lie on the pouch film, spaced apart from one another. The electrode assemblies are in a stacked form, for example. This means that the anode, the separator and the cathode of the electrode assembly are stacked on one another. Alternatively, the electrode assemblies are coiled in one another.

B) The pouch film is folded over along the length, such that the width of the pouch film is in particular halved, and the pouch film has a first pouch film half and a second pouch film half. These halves form a type of cavity, within which the electrode assemblies are located.

C) The two pouch film halves are joined together at defined intervals along the width of the pouch film, so as to produce adjoining pockets by which the electrode assemblies are surrounded. Advantageously, the intervals at which the two pouch film halves are joined together are regular. Alternatively, these intervals may also be irregular. The joining together of the pouch film halves is effected, in particular, by sealing.

D) Joining together the pouch film halves at their open ends, in particular by sealing the pouch film to one another.

In a first variant for producing a battery cell system according to the invention, the method steps are effected in a transposed sequence. The first method in the first variant has the following steps:

A') Folding over the pouch film along the length, such that the width of the pouch film is in particular halved, and the pouch film has a first pouch film half and a second pouch film half. The pouch film halves form a type of cavity, into which the electrode assemblies can be inserted.

B') Joining together the two pouch film halves at defined intervals along the width of the pouch film, so as to produce adjoining pockets. The intervals in this case are selected so as to be regular or, alternatively, irregular. The joining together of the pouch film halves is effected, in particular, by sealing.

C') Introducing electrode assemblies into the pockets of the pouch film. The electrode assemblies comprise at least one anode having at least one anode contact lug, at least one separator, and at least one cathode having at least one cathode contact lug. The electrode assemblies are inserted into the pockets of the pouch film such that the anode contact lugs and the cathode contact lugs project beyond a first length of the pouch film, in particular in an offset manner in relation to one another.

D') Joining together the pouch film halves at their open ends, in particular in that they are sealed to each other.

The sequence of execution of the method steps may also be transposed in the two variants of the first method. For example, in the first variant of the first method, step D may also be executed before step C.

Additionally disclosed is a second method for producing a battery cell system according to the invention, wherein the anode contact lugs and the cathode contact lugs are disposed on opposite sides of the electrode assembly. The pouch film of the battery cell system has a length and a width, the length of the pouch film in particular being longer than its width. The pouch film additionally has recesses realized, for example, in the shape of a semicircle. Alternatively, the recesses may also be of any other shape. The second method has the following steps:

AA) Applying electrode assemblies, comprising at least one anode having at least one anode contact lug, at least one separator, and at least one cathode having at least one cathode contact lug, to the pouch film, in particular centrally. The anode contact lugs and the cathode contact lugs in this case are disposed on opposite sides in the direction of a first lateral width and a second lateral width of the pouch film. The electrode assemblies in this case cover not more than half of the width of the pouch film and lie on the pouch film, spaced apart from one another. The electrode assemblies are in a stacked form, for example. This means that the anode, the separator and the cathode are stacked on one another. Alternatively, the electrode assemblies are coiled in one another.

BB) Contacting respectively one anode contact lug of an electrode assembly to respectively one cathode contact lug of an adjacent electrode assembly. The contacting is effected, for example, by welding, in particular by laser welding, or by roll-bonding.

CC) Folding over the pouch film along the length on both sides, such that the width of the pouch film is in particular halved, and the pouch film forms a type of cavity, within which the electrode assemblies are located. In this case, for example, a first pouch film piece and a second pouch film piece are folded over in the direction of the center of the pouch film, such that the electrode assemblies are enclosed by the pouch film. The two folded-over pouch film pieces in this case overlap in a region located, in particular, in the center of the pouch film. Following the folding-over of the pouch film pieces, the recesses of the pouch film are disposed on the anode contact lugs and cathode contact lugs that are connected to one another. The recesses allow a direct contact to the anode contact lugs and cathode contact lugs, such that for example the latter can be electrically contacted can be connected to balancing lines that provide for a uniform voltage of all pouch cells of a battery module. Alternatively, the recesses are not made in the pouch film until the pouch film pieces are in the folded-over state.

DD) Joining together along the width, at defined intervals, the pouch film regions that lie on one another, so as to produce adjoining pockets, by which the electrode assemblies are surrounded. The intervals at which the two pouch film halves are joined together are regular. Alternatively, these intervals may also be irregular. In a particularly advantageous embodiment, the pouch film pieces that lie on one another are also joined together around the recesses of the pouch film, in particular sealed to one another.

EE) Joining together the open ends of the pouch film along the length, such that the pockets are sealed on all sides. As a result of the two pouch film halves having previously been folded over in the direction of the center of the pouch film, in this case the two pouch film pieces, overlapping in a region, lie centrally on the electrode assemblies. The joining together of the two pouch film pieces is effected, in particular, by sealing.

The sequence of execution of the method steps of the second method may also be transposed. For example, step BB may be effected before step AA, or step EE before step DD.

Additionally disclosed is a third method for producing a battery cell system according to the invention, wherein the anode contact lugs and the cathode contact lugs are disposed on opposite sides of the electrode assembly. The pouch film of the battery cell system has a length and a width, the length of the pouch film in particular being longer than the width. The third method has the following steps:

AAA) Applying electrode assemblies to the pouch film, these electrode assemblies comprising at least one anode having at least one anode contact lug, at least one separator, and at least one cathode having at least one cathode contact lug. The anode contact lugs and the cathode contact lugs in this case are disposed on opposite sides in the direction of a first lateral width and in the direction of a second lateral width of the pouch film. The electrode assemblies in this case cover not more than half of the width of the pouch film and lie on the pouch film, spaced apart from one another. The electrode assemblies are in a stacked form, for example. This means that the anode, the separator and the cathode are stacked on one another. Alternatively, the electrode assemblies are coiled in one another.

BBB) Contacting respectively one anode contact lug of an electrode assembly to respectively one cathode contact lug of an adjacent electrode assembly, and contacting the anode contact lug and the cathode contact lug to a low-current tab that constitutes a voltage tap, the low-current tab projecting beyond a first length of the pouch film.

CCC) Folding over the pouch film along the length, such that the width of the pouch film is in particular halved, and has a first pouch film half and a second pouch film half. The pouch film halves form a type of cavity, within which the electrode assemblies are located.

DDD) Joining together the two pouch film halves along the width, at defined intervals, so as to produce adjoining pockets that surround the electrode assemblies.

Advantageously, the intervals at which the two pouch film halves are joined together are regular. Alternatively, these intervals may also be irregular. The joining together of the pouch film halves is effected, in particular, by sealing.

EEE) Joining together the pouch film halves at their open ends, in particular by sealing.

The sequence of execution of the method steps of the third method may also be transposed. For example, step BBB may be effected before step AAA, or step EEE before step DDD.

In a preferred embodiment of one of the described methods, an electrolyte, in particular a liquid electrolyte, is introduced into the pockets of the pouch film. The electrolyte serves as a lithium-ion conductor, and enables processes in the anode and in the cathode by which lithium ions can be taken in and given out. The electrolyte comprises, for example, a mixture of acyclic carbonates (for example, ethyl methyl carbonate, dimethyl carbonate or diethyl carbonate), or cyclic carbonates (for example, ethylene carbonate or propylene carbonate), in which a conducting salt, for example lithium hexafluorophosphate ($LiPF_6$), lithium perchlorate (LiClO4), lithium hexafluoroarsenate (LiAsF6) or lithium tetrafluoroborate (LiBF4) is dissolved.

In a particularly preferred embodiment, the joining together of the pouch film halves is effected by means of a sealing method, such that sealed seams are produced. The sealing method is for example a thermal sealing method or an ultrasonic sealing method. It is advantageous, in the case of a sealed joint produced by a sealing, that a tight, good joint is produced. Furthermore, it is advantageous that the sealing has only a slight layer thickness, thereby preventing diffusion processes. Furthermore, the sealing produces a materially bonded joint that is particularly stable in its sealing effect.

In an embodiment of one of the methods, in the joining together of transverse seams of the pouch film, one, two or three pouch film projections are realized at the ends thereof.

Additionally disclosed is a battery module that comprises a pouch film according to the invention and/or a battery cell system according to the invention. Furthermore disclosed is a battery that comprises a battery module according to the invention, and also use of the same in an electric vehicle, in a hybrid vehicle or in a plug-in hybrid vehicle. Alternatively, the battery is used, for example, in ships, two-wheeled vehicles, aircraft, stationary energy storage devices, electric tools, entertainment electronics and/or household appliances.

BRIEF DESCRIPTION OF THE DRAWINGS

Embodiments of the present invention are represented in the drawing and explained in greater detail in the following description of the figures. There are shown.

DETAILED DESCRIPTION

Figure 1:
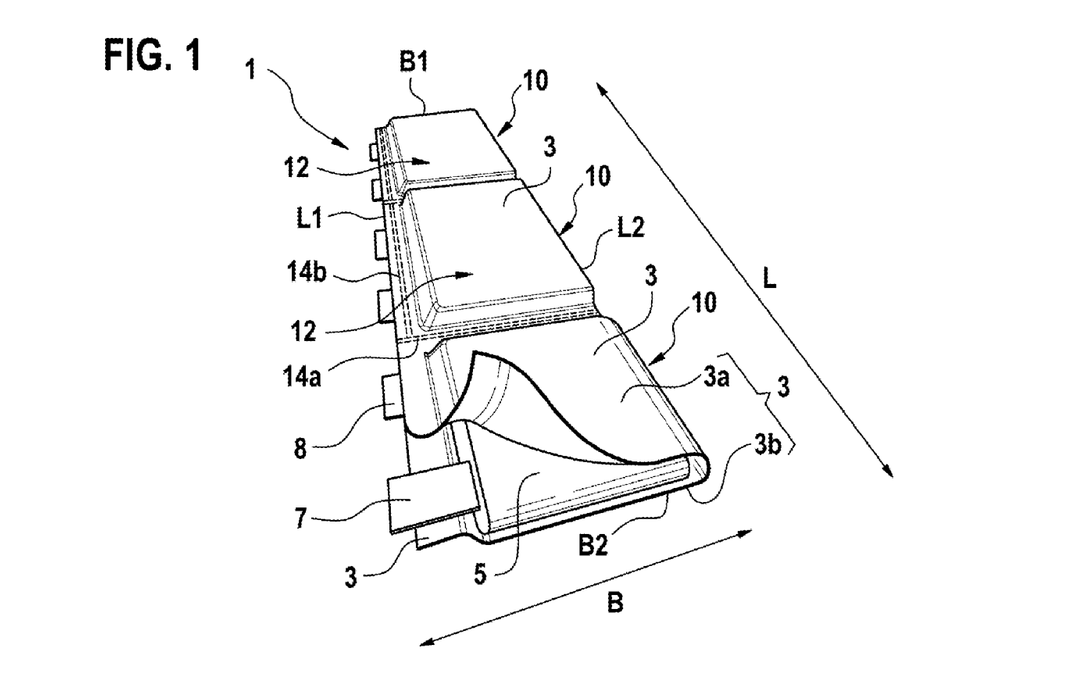
FIG. 1a is schematic representation of a 3D view of a first embodiment of a battery cell system according to the invention having a pouch film and electrode assemblies.
Figure 2:
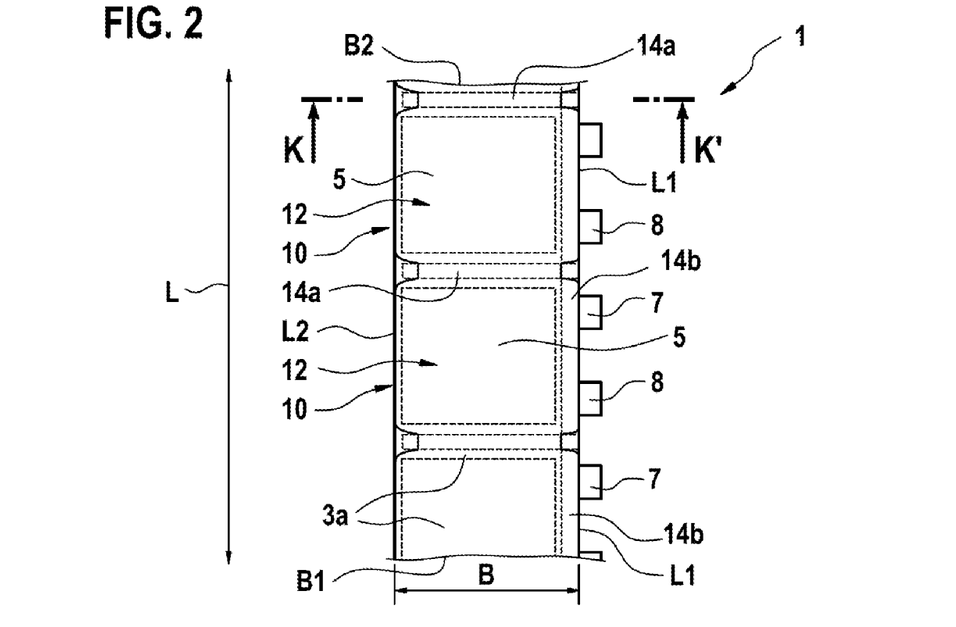
FIG. 2 is a schematic representation of a top view of the battery cell system according to FIG. 1.

FIGS. 1 and 2 show a first embodiment of a battery cell system 1 according to the invention. In FIG. 1 the battery cell system 1 is shown in a 3D view, and shown in a top view in FIG. 2.

The battery cell system 1 has a pouch film 3 and three electrode assemblies 5. The three electrode assemblies 5 exemplarily represent any number of electrode assemblies 5.

The pouch film 3 has a length L and a width B, the length L being longer than the width B. Furthermore, the pouch film 3 has a first lateral length L1 and, opposite the latter, a second lateral length L2, and has a first lateral width B1 and, opposite the latter, a second lateral width B2. The pouch film 3 forms mutually separate pockets 12 that are connected to one another in a foldable manner. The pouch film 3 is impermeable to electrolyte.

Each electrode assembly 5 has an anode having an anode contact lug 7, a separator, and a cathode having a cathode contact lug 8, which are stacked on one another. In an alternative embodiment, not represented, an electrode assembly 5 has a plurality of anodes and/or anode contact lugs 7 and a plurality of cathodes and/or cathode contact lugs 8. An electrode assembly 5 is inserted in each pocket 12 of the pouch film 3 in such a manner that the anode contact lug 7 and the cathode contact lug 8 project, offset in relation to one another, beyond a first lateral length L1 of the pouch film 3.

Respectively one electrode assembly 5, together with a pocket 12 of the pouch film 3, forms a pouch cell 10.

The pouch film 3 comprises, for example, a laminate comprising at least one plastic, in particular a polyolefin such as, for example, a polyethylene and/or a polypropylene. In one embodiment, the pouch film 3 does not comprise any aluminum, in particular any metal.

The pouch film 3 is folded over along the longitudinal extent, such that there is a first pouch film half 3a and a second pouch film half 3b. Transverse seams 14a, which form pockets 12 that are spatially separate from one another, are made in the pouch film halves 3a, 3b, along the width B, at intervals, in particular at regular intervals. The transverse seams 14a are made, for example, by sealing the two pouch film halves 3a, 3b to each other. The pockets 12 of the pouch film 3 are closed along the length L by a longitudinal seam 14b, which is made, for example, by sealing the pouch film halves 3a, 3b at their open end. The anode contact lugs 7 and the cathode contact lugs 8 in this case are also sealed in, in a region in which these lugs lie against the pouch film halves 3a, 3b.

An electrolyte, in particular a liquid electrolyte, is introduced into the pockets 12 of the pouch film 3, the pockets 12 forming a barrier for the electrolyte.

Figure 3:
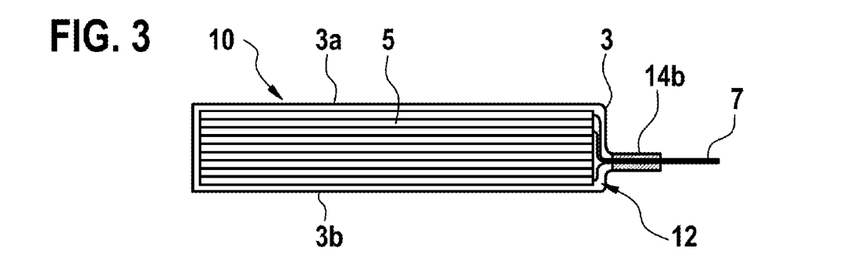
FIG. 3 is a schematic representation of a cross-sectional surface along a section line K-K' according to FIG. 2.

Represented in FIG. 3 is a cross section along a section line K-K' according to FIG. 2. It can be seen from FIG. 3 that the pouch film 3 encloses the electrode assembly 5 in the form of a pocket 12, such that a pouch cell 10 is formed. The anode contact lug 7 of the electrode assembly 5 projects beyond the two pouch film halves 3a, 3b. A longitudinal seam 14b, which connects the anode contact lug 7 to the pouch film 3 in a tight manner in an outlet region, is realized at the outlet of the anode contact lug 7 from the pocket 12 of the pouch film 3.

Figure 4A:
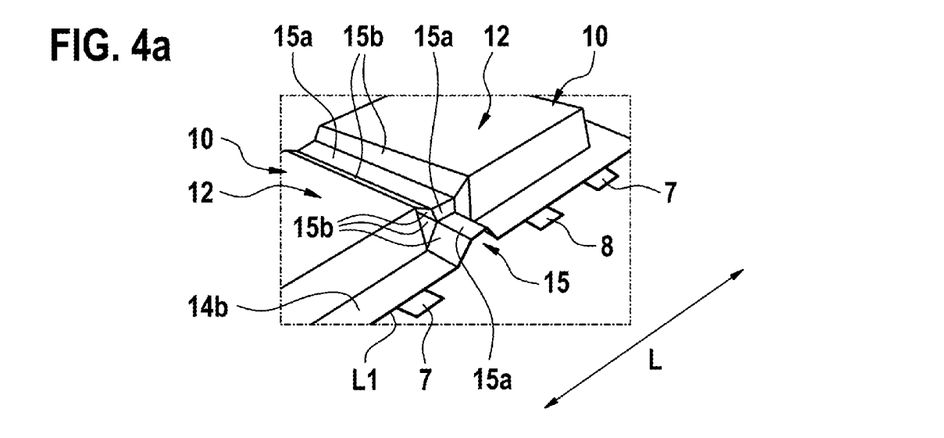
FIG. 4a is a schematic representation of a lateral 3D view of the first lateral length L1 according to FIG. 1, the projection of the pouch film between the pouch cells being in an unfolded state.
Figure 4B:
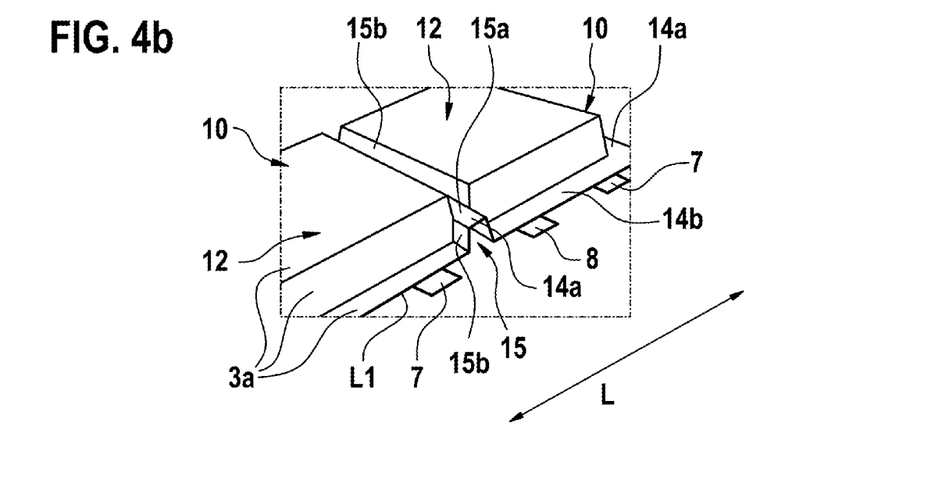
FIG. 4b is a schematic representation of a lateral 3D view of the first lateral length L1 according to FIG. 1, the projection of the pouch film between the pouch cells being in a folded state, FIG. 5 includes views a) through d) showing schematic representations of the steps A through D, respectively, of a first method for producing a battery cell system according to the invention, in the first embodiment, FIG. 6 includes views a) and b) showing schematic representations of the steps AA and BB of a second method for producing the battery cell system according to the invention, in a second embodiment, and a schematic representation of a top view of a portion of a battery cell system according to the invention having a pouch film and electrode assemblies, in the second embodiment.

Represented in FIGS. 4a and 4b is a lateral view of the first lateral length L1 according to FIG. 1. Only two coherent pouch cells 10 are represented. The latter exemplarily represent any number of pouch cells 10. In the following, only the details relating to the projections 15 of the pouch film 3 between the pouch cells 10 are described. FIG. 4a shows a projection 15 in an unfolded state, such that there is the fold pattern represented in FIG. 4a. In this case, a central region 15a is surrounded by flanking regions 15b. In FIG. 4b, the pouch cells 10 have been pushed towards one other, such that they are closer to one other. The projection 15 is then in a folded state. The flanking regions 15b then lie directly against the respective pouch cells 10, in that they are folded in the direction of the respective pouch cell 10. Some of the flanking regions 15b project beyond the pouch cell 10. The central region 15a is then disposed at least substantially orthogonally in relation to the flanking regions 15b, such that the fold corresponds substantially to an H shape. At the transitions from the central region 15a to the flanking regions 15b, at least at the level of the pouch cells 10, a transverse seam 14b is made, in particular by sealing, for each transition. Alternatively, at least one transverse seam 14b is inserted, or sealed in, in the central region 15a, at least at the level of the pouch cells 10. Furthermore alternatively, the central region 15a is completely sealed over the entire width, or at least over a large portion of the width.

Represented in FIGS. 5a-d is a first method for producing a battery cell system 1 according to the invention, in the first embodiment, the anode contact lugs 7 and the cathode contact lugs 8 being disposed on the same side of the electrode assembly 5. The battery cell system 1 exemplarily has three electrode assemblies 5, which exemplarily represent any number of electrode assemblies 5. The pouch film 3 of the battery cell system 1 has a length L and a width B, the length L of the pouch film 3 being in particular longer than the width B.

Figure 5:
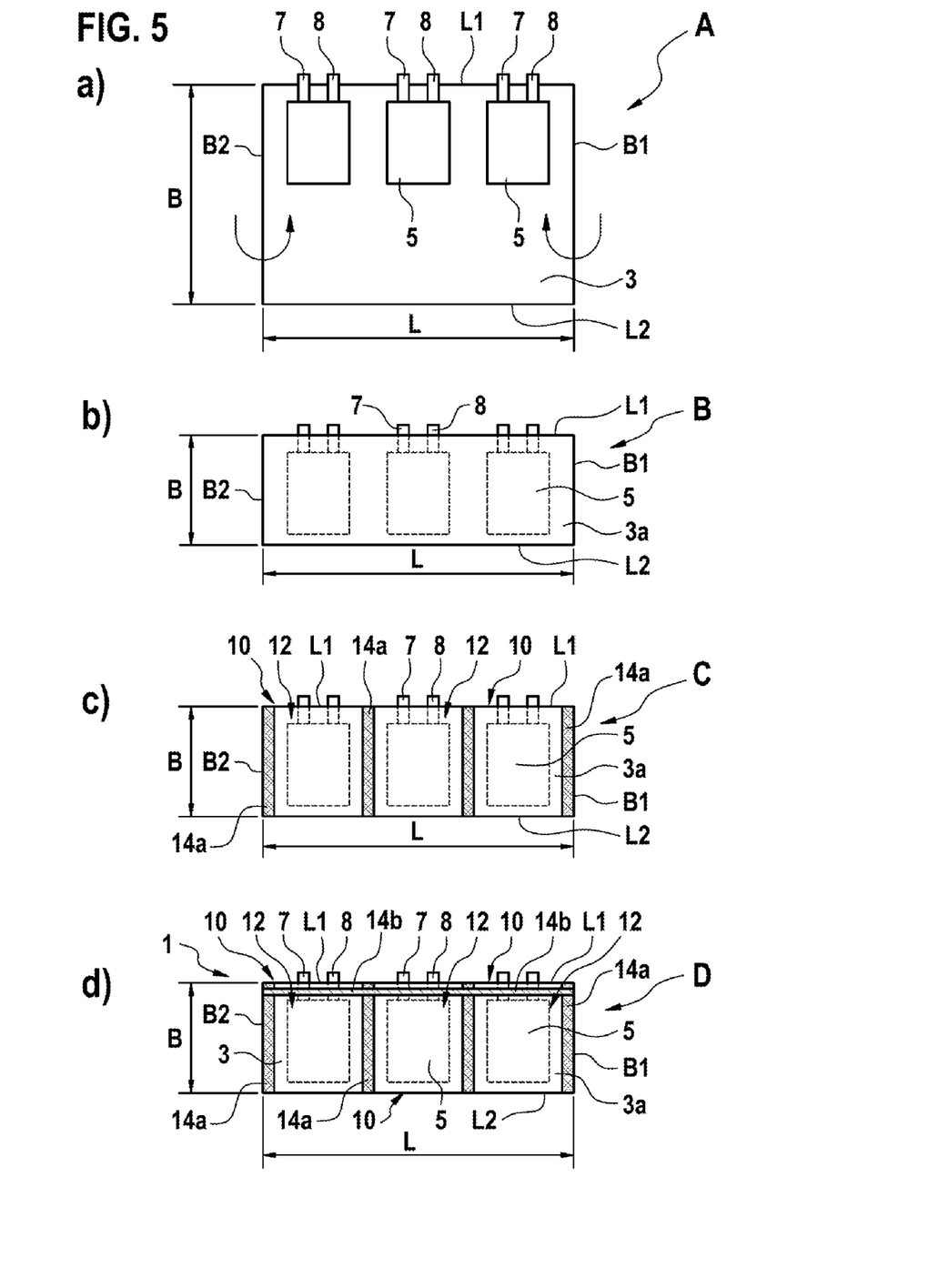

The method step A is represented in FIG. 5a. The electrode assemblies 5 are applied to the pouch film 3. The electrode assemblies 5 comprise at least one anode having at least one anode contact lug 7, at least one separator, and at least one cathode having at least one cathode contact lug 8. The electrode assemblies 5 are applied to the pouch film 3 in such a manner that the anode contact lugs 7 and the cathode contact lugs 8 project, offset in relation to one another, over the first lateral length L1 of the pouch film 3. The electrode assemblies 5 in this case cover substantially half of the width B of the pouch film 3, and lie on the pouch film 3, spaced apart from one another. The electrode assemblies 5 are in a stacked form, for example. This means that the anode, the separator and the cathode are stacked on one another. Alternatively, the electrode assembly 5 is coiled in one another. In FIG. 5a, the next method step B is already indicated by semicircular arrows, intended to indicate folding-over of the pouch film 3 at its second lateral length L2, in the direction of the electrode assemblies 5.

The method step B is represented in FIG. 5b. The pouch film 3 has been folded over along the length L, such that the width B of the pouch film 3 has been substantially halved, and the pouch film 3 has a first pouch film half 3a and a second pouch film half 3b. Only the first pouch film half 3a is visible in FIG. 5b. The pouch film halves 3a, 3b form a type of cavity, within which the electrode assemblies 5 are located.

The method step C is represented in FIG. 5c. The two pouch film halves 3a, 3b are joined together, along the width B of the pouch film 3, at regular intervals. In this way, adjoining pockets 12 are produced, by which the electrode assemblies 5 are surrounded. Respectively one electrode assembly 5, together with a pocket 12 of the pouch film 3, constitutes a pouch cell 10. In an alternative embodiment, not represented, the intervals at which the two pouch film halves 3a, 3b are joined together are irregular. The joining together of the pouch film halves 3a, 3b is effected, for example, by a sealing method. Transverse seams 14a, in particular sealed seams, are produced in this case.

The method step D is represented in FIG. 5d. The pouch film halves 3a, 3b are joined together at their open ends, for example in that the pouch film halves 3a, 3b are sealed to each other. A continuous longitudinal seam 14b is produced in this case, which also encloses the anode contact lugs 7 and the cathode contact lugs 8 in a region in which they lie on the pouch film 3, such that the pockets 12 of the pouch film 3 are closed in a tight manner.

The method steps of the first method represented in FIGS. 5a-d may also be effected in a transposed sequence.

Figure 6:
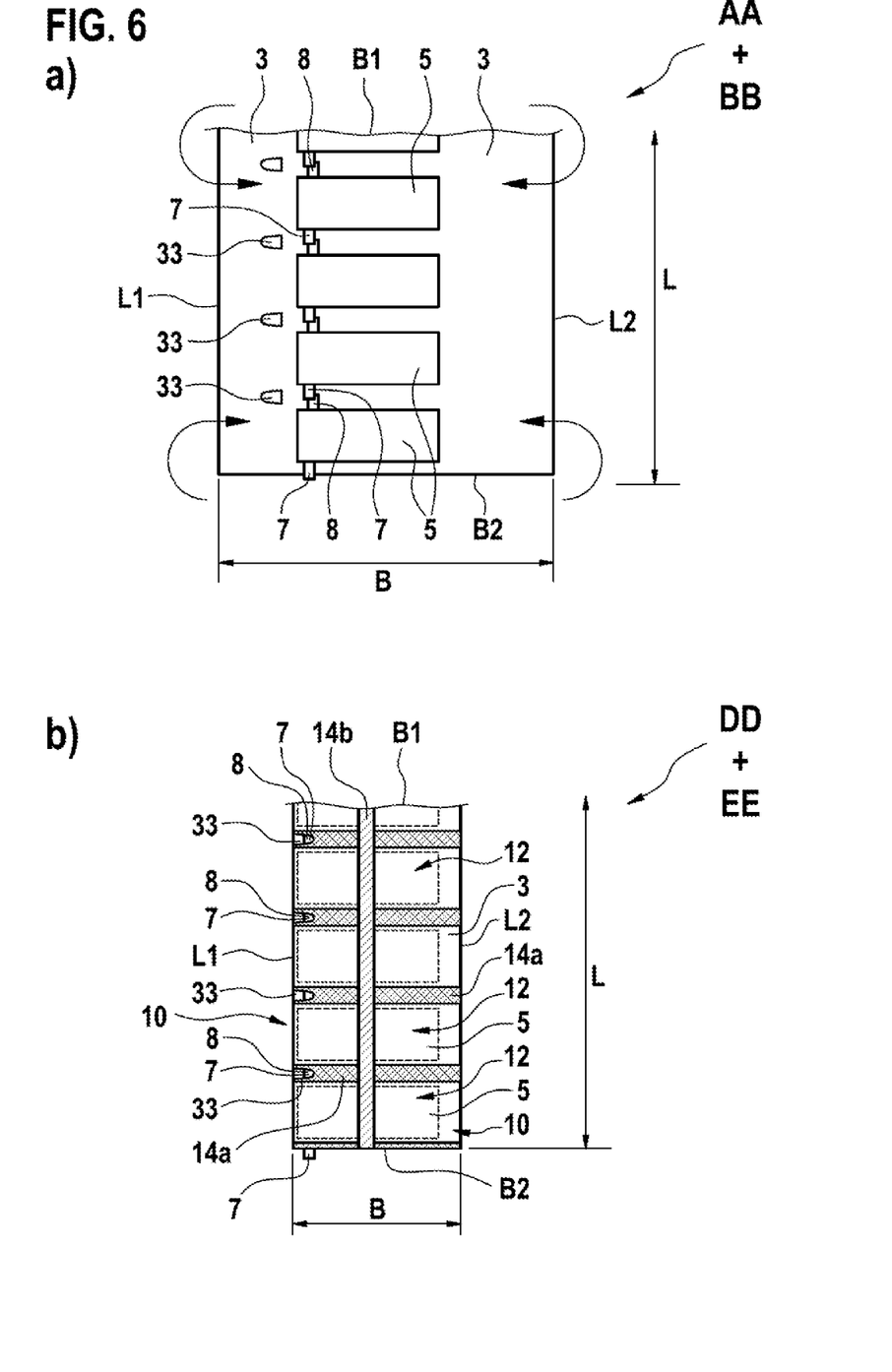

The method steps AA and BB of a second method for producing a battery cell system 1 according to the invention, in a second embodiment, are represented in FIG. 6a. The anode contact lugs 7 and the cathode contact lugs 8 of the electrode assemblies 5 are disposed on opposite sides of the electrode assembly 5. The pouch film 3 of the battery cell system 1 has a length L and a width B, the length L of the pouch film 3 being in particular longer than its width B. The pouch film 3 additionally has recesses 33 realized, for example, in the shape of a semicircle. Alternatively, the recesses 33 may also be of any other shape.

In step AA, the electrode assemblies 5, which have at least one anode having at least one anode contact lug 7, at least one separator, and at least one cathode having at least one cathode contact lug 8, are applied centrally to the pouch film 3. The anode contact lugs 7 and the cathode contact lugs 8 in this case are oriented in the direction of a first lateral width B1 and a second lateral width B2 of the pouch film 3. The electrode assemblies 5 cover substantially half of the width B of the pouch film 3 and lie on the pouch film 3, spaced apart from one another. The electrode assemblies 5 are in a stacked form, for example. This means that the anode, the separator and the cathode are stacked on one another. Alternatively, the electrode assemblies 5 are coiled in one another.

In step BB, respectively one anode contact lug 7 of an electrode assembly 5 is electrically contacted to respectively one cathode contact lug 8 of an adjacent electrode assembly 5. The contacting is effected, for example, by welding, in particular by laser welding, or by roll-bonding.

In FIG. 6a, the next method step CC is already indicated by semicircular arrows, which are intended to indicate folding-over of the pouch film 3 on both sides in the direction of the electrode assemblies 5.

In the next represented step CC, the pouch film 3 is folded over, along the length L, at the first lateral length L1 and at the second lateral length L2, in the direction of the electrode assemblies 5, such that the width B of the pouch film 3 has been substantially halved. The pouch film 3 thus forms a type of cavity, within which the electrode assemblies 5 are located. The two folded-over pouch film pieces in this case overlap in a region located, in particular, in the center of the pouch film 3. The results of all further method steps are represented in FIG. 6b.

Represented in FIG. 6b is a top view of a portion of a battery cell system 1 according to the invention, having a pouch film 3 and electrode assemblies 5, in the second embodiment. The following describes only features that differ from the embodiment of the battery cell system 1 represented in FIG. 1.

Following the folding-over of the pouch film pieces, the recesses 33 of the pouch film 3 lie on the anode contact lugs 7 and cathode contact lug 8 that are connected to one another. Through the recesses 33, it is possible to effect a direct contact to the anode contact lugs 7 and cathode contact lugs 8, such that for example the latter can be electrically contacted to balancing lines that provide for a uniform voltage of all pouch cells of a battery module.

By means of method step DD, the superimposed pouch film pieces of the pouch film 3 are joined together, along the width B, at regular intervals, in particular sealed to one another, so as to realize transverse seams 14a that realize adjoining pockets 12. The transverse seams 14a extend around the recesses 33, such that the latter are likewise sealed in a seal-tight manner.

By means of the method step EE, the open ends of the pouch film pieces 3 are joined together, along the length L, in particular sealed, such that a continuous longitudinal seam 14b is formed and the pockets 12 are sealed, in particular completely. The longitudinal seam 14b is disposed centrally on the electrode assemblies 5. Alternatively, the longitudinal seam 14b is disposed at any other location.

Figure 7:
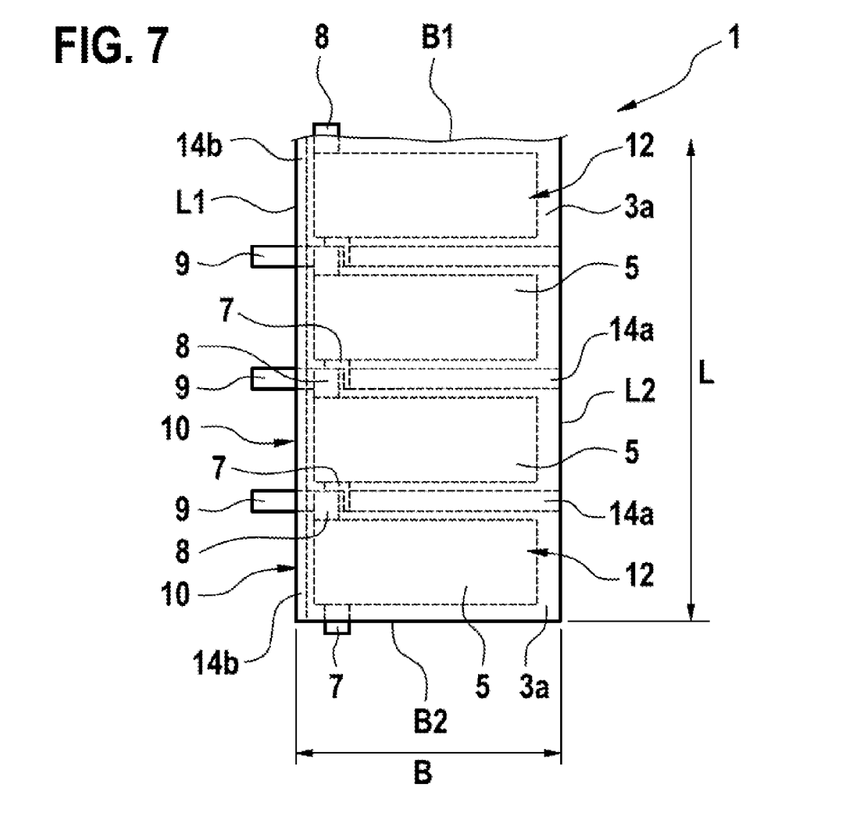
FIG. 7 is a schematic representation of a top view of a portion of a battery cell system according to the invention having a pouch film and electrode assemblies, in a third embodiment.

Represented in FIG. 7 is a top view of a portion of a battery cell system 1 according to the invention, having a pouch film 3 and electrode assemblies 5, in a third embodiment, which is produced according to a third method.

Unlike the first embodiment of the battery cell system 1 represented in FIG. 1, the anode contact lug 7 and the cathode contact lug 8 of the electrode assembly 5 are disposed on opposite sides of the electrode assembly 5. The anode contact lug 7 of an electrode assembly 5 is contacted to a cathode contact lug 8 of an adjacent electrode assembly 5. The anode contact lug 7 of an electrode assembly 5 is furthermore contacted to a low-current tab 9, and the cathode contact lug 8 of an adjacent electrode assembly 5 is contacted to the same low-current tab 9. The low-current tab 9 is thus disposed such that it projects beyond a first lateral length L1 of the pouch film 3. The low-current tab 9 serves to effect contacting to so-called balancing lines for the purpose of balancing, which electrically contact a cell monitoring system CSC. The anode contact lugs 7 and the cathode contact lugs 8 are located in the transverse seam 14a of the pouch film 3, such that, for example, they are at least partly concomitantly sealed-in. The low-current tab 9 is concomitantly sealed-in by the longitudinal seam 14b, in a region in which the low-current tab lies against the pouch film halves 3a, 3b.

Figure 8:
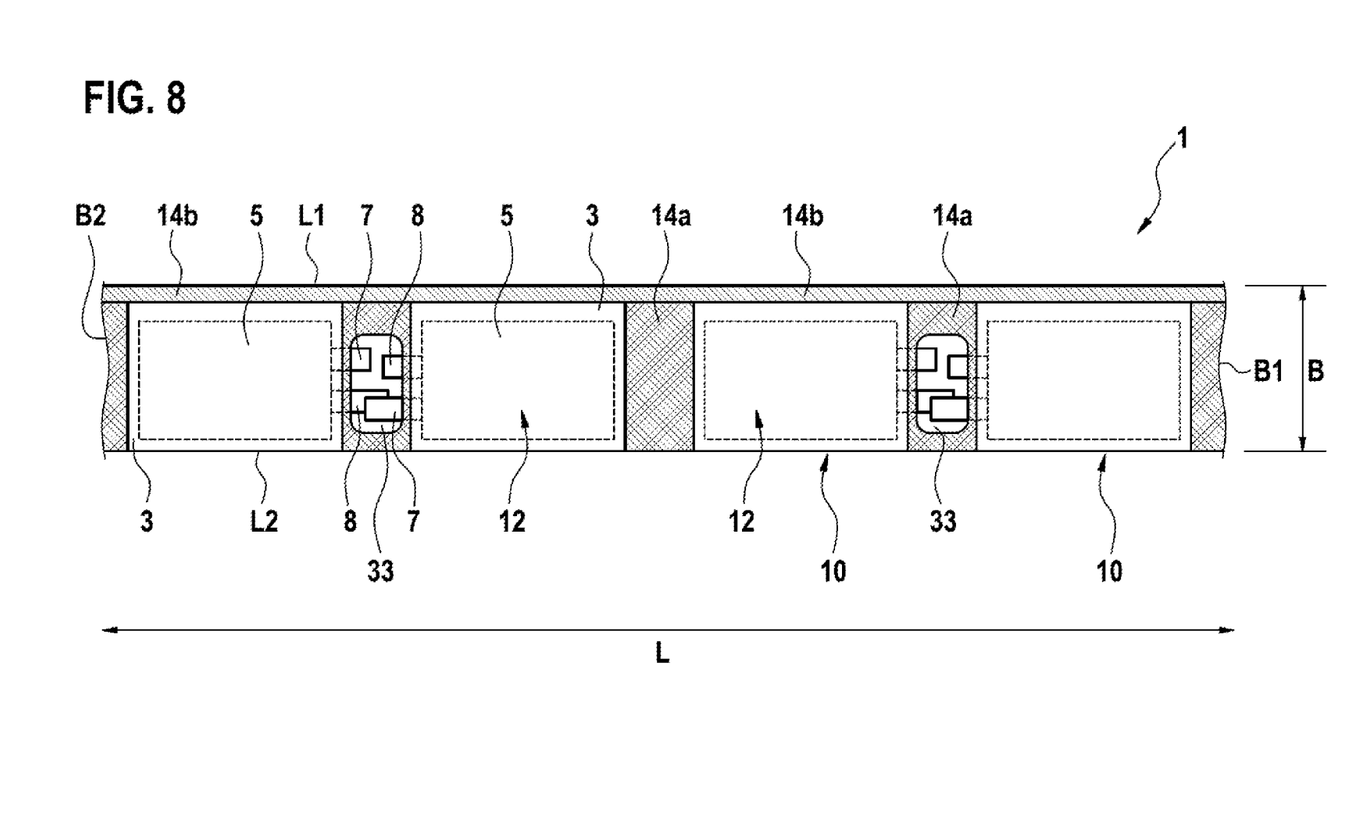
FIG. 8 is a schematic representation of a top view of a portion of a battery cell system according to the invention having a pouch film and electrode assemblies, in a fourth embodiment.

A fourth embodiment of a battery cell system 1 according to the invention is represented in FIG. 8. The following describes only features that differ from the first embodiment of the battery cell system 1 represented in FIG. 1. The contact lugs 7, 8 of the electrode assemblies 5 are disposed at short electrode-assembly lateral widths. Respectively two adjacent electrode assemblies 5 of the battery cell system 1 face towards one another, i.e. the anode contact lugs 7 and the cathode contact lugs 8 of respectively two electrode assemblies 5 face towards one another. Respectively one anode contact lug 7 of an electrode assembly 5 is electrically contacted to a cathode contact lug 8 of the adjacent electrode assembly 5. In FIG. 8, the respectively only one of the two contact lugs 7, 8 of a pouch cell 10 is contacted, the other contact lug 7, 8 being free in each case, such that the latter, following folding of the battery cell system 1, can be contacted to the adjacent pouch cell 10, which in FIG. 8 in the unfolded state faces away therefrom. In this way, a series connection of the pouch cells can be effected. Alternatively, the individual pouch cells 10 can be connected to one another in parallel. The contact lugs are advantageously all of the same length. In FIG. 8, some contact lugs 7, 8 are shown to be shorter, for illustrative purposes. The pouch film 3 has recesses 33. The recesses 33 of the pouch film 3 lie on the anode contact lugs 7 and cathode contact lugs 8 that are connected to one another. Through the recesses 33, it is possible to effect direct contact to the anode contact lugs 7 and cathode contact lugs 8, such that the latter can be electrically contacted and can be connected to balancing lines. In an alternative embodiment, not represented, respectively one recess is realized in the pouch film 3, which is not tight against moisture, for each pair of interconnected contact lugs. The transverse seams 14a then seal around the recesses 33.

In each of the variants of the battery cell systems 1 represented in FIGS. 1, 2 and 5 to 8, the electrode assemblies 5 may also be rotated by 90°, the contact lugs 7, 8 retaining their orientation and thus being as represented in the said figures.

The invention claimed is:

1. A pouch film (3) for a battery cell system (1), the pouch film (3) having a longitudinal direction and comprising mutually separate pockets (12) for insertion of electrode assemblies (5), the pockets (12) being impermeable to electrolyte, and the pockets (12) being physically connected to one another in a foldable manner via the pouch film (3), wherein the pouch film (3) has a fold pattern between the pockets (12), wherein the fold pattern has a central region (15a) substantially parallel to the longitudinal direction and flanking regions (15b) surrounding the central region (15a) and substantially orthogonal to the central region (15a), and wherein the flanking regions (15b) are separate from the pockets (12).

2. The pouch film (3) according to claim 1, characterized in that the pouch film (3) is a composite film that does not comprise any aluminum.

3. A battery cell system (1), comprising a pouch film (3) according to claim 1, having at least two pockets (12) and having at least two electrode assemblies (5), characterized in that the electrode assemblies (5) are inserted in the mutually separate pockets (12) of the pouch film (3), such that respectively one electrode assembly (5), together with a pocket (12) of the pouch film (3), forms a pouch cell (10), the pouch cells (10) being physically connected to one another in a foldable manner via the pouch film (3).

4. The battery cell system (1) according to claim 3, characterized in that the pouch film (3) has a length (L) and a width (B), and the pouch film (3) is folded over along the longitudinal extent, such that there are two pouch film halves (3a, 3b) that are disposed on one another and that have an open end and an end that is closed by folding-over of the pouch film (3), and the pouch film halves (3a, 3b) are joined together, along the width (B), at intervals, in such a manner that there are pockets (12) that are spatially separate from one another.

5. The battery cell system (1) according to claim 4, characterized in that the pockets (12) of the pouch film (3) are closed along the length (L), at least partly, at their open end, by joining together of the two pouch film halves (3a, 3b).

6. The battery cell system (1) according to claim 4, characterized in that the joining together of the pouch film halves (3a, 3b) is effected in the form of seams, the seams that separate the pockets (12) from one another along the width (B) being transverse seams (14a), and the seam (14) that closes the pockets (12) along the length (L) being a longitudinal seam (14b).

7. The battery cell system (1) according to claim 3, characterized in that at least one anode contact lug (7) of an anode of the electrode assembly (5) and at least one cathode contact lug (8) of a cathode of the electrode assembly (5) project beyond the pocket (12), on the same side of the pocket (12), or on opposite sides of the pocket (12).

8. A method for producing a battery cell system (1) according to claim 3, a pouch film (3) having a length (L) and a width (B), the method comprising the following steps:
   A) Applying electrode assemblies (5), comprising at least one anode having at least one anode contact lug (7), at least one separator, and at least one cathode having at least one cathode contact lug (8), to the pouch film (3), the anode contact lugs (7) and the cathode contact lugs (8) projecting beyond a first lateral length (L1) of the pouch film (3), and the electrode assemblies (5) covering not more than half of the width (B) of the pouch film (3) and lying on the pouch film (3), spaced apart from one another;
   B) Folding over the pouch film (3) along the length (L), such that the width (B) of the pouch film (3) is in particular halved, and the pouch film (3) has a first pouch film half (3a) and a second pouch film half (3b), which form a type of cavity, within which the electrode assemblies (5) are located;
   C) Joining together the two pouch film halves (3a, 3b) at, in particular, regular intervals along the width (B) of the pouch film (3), so as to produce adjoining pockets (12) by which the electrode assemblies (5) as surrounded; and
   D) Joining together the pouch film halves (3a, 3b) at their open ends.

9. A method for producing a battery cell system (1) according to claim 3, a pouch film (3) having a length (L) and a width (B), and the pouch film (3) having recesses (33), the method comprising the following steps:
   AA) Applying electrode assemblies (5) comprising at least one anode having at least one anode contact lug (7), at least one separator, and at least one cathode having at least one cathode contact lug (8), to the pouch film (3), the anode contact lugs (7) and the cathode contact lugs (8) being disposed on opposite sides in the direction of a first lateral width (B1) and a second lateral width (B2) of the pouch film (3), and the electrode assemblies (5) covering not more than half of the width (B) of the pouch film (3) and lying on the pouch film (3), spaced apart from one another;
   BB) Contacting respectively one anode contact lug (7) of an electrode assembly (5) to respectively one cathode contact lug (8) of an adjacent electrode assembly (5);
   CC) Folding over the pouch film (3) along the length (L), and the pouch film (3) forms a type of cavity, within which the electrode assemblies (5) are located, and the recesses (33) of the pouch film (3) are disposed on the anode contact lugs (7) and cathode contact lug (8) that are connected to one another, such that they can be electrically contacted;
   DD) Joining together along the width (B) at regular intervals, the pouch film pieces that lie on one another, so as to produce adjoining pockets (12), by which the electrode assemblies (5) are surrounded; and
   EE) Joining together the open ends of the pouch film (3) along the length (L).

10. A method for producing a battery cell system (1) according to claim 3, a pouch film (3) having a length (L) and a width (B), the length (L) of the pouch film (3) in particular being longer than the width (B), having the following steps
   AAA) Applying electrode assemblies (5) comprising at least one anode having at least one anode contact lug (7), at least one separator, and at least one cathode having at least one cathode contact lug (8), to the pouch film (3), the anode contact lugs and (7) the cathode contact lugs (8) being disposed on opposite sides in the direction of a first lateral width (B1) and in the direction of a second lateral width (B2) of the pouch film (3), and the electrode assemblies (5) covering not more than half of the width (B) of the pouch film (3) and lying on the pouch film (3), spaced apart from one another;
   BBB) Contacting respectively one anode contact lug (7) of an electrode assembly (5) to respectively one cathode contact lug (8) of an adjacent electrode assembly (5), and contacting the anode contact lug and (7) the cathode contact lug (8) to a low-current tab (9) that constitutes a voltage tap, the low-current tab (9) projecting beyond a first lateral length (L1) of the pouch film (3);
   CCC) Folding over the pouch film (3) along the length (L), and has a first pouch film half (3a) and a second pouch film half (3b), which form a type of cavity, within which the electrode assemblies (5) are located;
   DDD) Joining together the two pouch film halves (3a, 3b) along the width (B) at regular intervals, so as to produce adjoining pockets (12), by which the electrode assemblies (5) are surrounded; and
   EEE) Joining together the pouch film halves (3a, 3b) at their open ends.

11. The method according to claim 8, an electrolyte being introduced into the pockets (12) of the pouch film (3).

12. The method according to claim 8, the joining together of the pouch film halves (3a, 3b) being effected by means of a sealing method, such that sealed seams are produced.

13. The method according to claim 8, wherein, in the joining together of the pouch film (3) along the width (B), one, two or three pouch film projections (15) are realized at the ends of transverse seams (14a).

14. A battery module comprising a pouch film (3) according to claim 1.

15. A battery module comprising a battery cell system (1) according to claim 3.

16. A method for producing a battery cell system (1) according to claim 3, a pouch film (3) having a length (L) and a width (B), the method comprising the following steps:
- A') Folding over the pouch film (3) along the length (L), and the pouch film (3) has a first pouch film half (3a) and a second pouch film half (3b), which form a type of cavity, into which the electrode assemblies (5) can be inserted;
- B') Joining together the two pouch film halves (3a, 3b) at regular intervals along the width (B) of the pouch film (3), so as to produce adjoining pockets (12);
- C') Introducing into the pockets (12) of the pouch film (3) electrode assemblies (5) comprising at least one anode having at least one anode contact lug (7), at least one separator, and at least one cathode having at least one cathode contact lug (8), the anode contact lugs (7) and the cathode contact lugs (8) projecting beyond a first lateral length L1 of the pouch film (3); and
- D') Joining together the pouch film halves (3a, 3b) at their open ends.

17. The pouch film (3) according to claim 1, wherein the pockets (12), when the battery cell system (1) is in an operating state, are physically connected to one another in a foldable manner via the pouch film (3).

18. The pouch film (3) according to claim 1, characterized in that the pouch film (3) is a composite film that does not comprise any metal.

19. The battery cell system (1) according to claim 3, characterized in that the pouch film (3) has a length (L) and a width (B), the length (L) being longer than the width (B), and the pouch film (3) is folded over along the longitudinal extent, such that there are two pouch film halves (3a, 3b) that are disposed on one another and that have an open end and an end that is closed by folding-over of the pouch film (3), and the pouch film halves (3a, 3b) are joined together, along the width (B), at regular intervals, in such a manner that there are pockets (12) that are spatially separate from one another.

20. The battery cell system (1) according to claim 4, characterized in that the joining together of the pouch film halves (3a, 3b) is effected in the form of sealed seams, the seams that separate the pockets (12) from one another along the width (B) being transverse seams (14a), and the seam (14) that closes the pockets (12) along the length (L) being a longitudinal seam (14b).

* * * * *